(12) United States Patent
Bisig

(10) Patent No.: US 7,162,217 B2
(45) Date of Patent: Jan. 9, 2007

(54) INTERCONNECTION CIRCUIT BETWEEN TWO LOOP ANTENNAS EMBEDDED IN A WRISTBAND OF A WRIST-CARRIED WIRELESS INSTRUMENT

(75) Inventor: Martin Bisig, Zuchwil (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 384 days.

(21) Appl. No.: 10/882,234

(22) Filed: Jul. 2, 2004

(65) Prior Publication Data

US 2006/0003721 A1    Jan. 5, 2006

(51) Int. Cl.
- H04B 1/18 (2006.01)
- H04B 1/06 (2006.01)
- H01Q 1/12 (2006.01)
- H04M 1/00 (2006.01)

(52) U.S. Cl. .............. 455/269; 455/344; 455/575.7; 343/718

(58) Field of Classification Search .......... 455/269, 455/347, 129, 344, 351, 66.1, 556.1, 274, 455/552.1, 575.5, 575.6, 575.1, 575.7, 277.1, 455/279.1; 343/701, 718, 702, 732, 748, 343/866

See application file for complete search history.

(56) References Cited

U.S. PATENT DOCUMENTS

| | | | |
|---|---|---|---|
| 4,736,196 A | 4/1988 | McMahon et al. | |
| 4,884,252 A | 11/1989 | Teodoridis et al. | |
| 5,132,697 A | 7/1992 | Tan | |
| 5,134,724 A | 7/1992 | Gehring et al. | |
| 5,136,303 A | 8/1992 | Cho et al. | |
| 5,179,733 A | 1/1993 | Matsui | |
| 5,243,356 A | 9/1993 | Hama | |
| 5,280,296 A | 1/1994 | Tan et al. | |
| 5,280,645 A | 1/1994 | Nguyen et al. | |
| 5,465,098 A | 11/1995 | Fujisawa | |
| 5,526,006 A | 6/1996 | Akahane et al. | |
| 5,532,705 A | 7/1996 | Hama | |
| 5,589,840 A | 12/1996 | Fujisawa | |
| 5,886,669 A * | 3/1999 | Kita ................ | 343/718 |
| 5,986,566 A | 11/1999 | Yamamori | |
| 6,134,428 A | 10/2000 | Nakazawa | |
| 6,329,903 B1 | 12/2001 | Yamamori | |

(Continued)

FOREIGN PATENT DOCUMENTS

| | | |
|---|---|---|
| CH | 684 868 A5 | 1/1991 |

(Continued)

OTHER PUBLICATIONS

Japanese Unexamined Utility Model Publication No. 56-085409; Dec. 4, 1954.

(Continued)

Primary Examiner—Aung Moe
(74) Attorney, Agent, or Firm—Sughrue Mion, PLLC

(57) ABSTRACT

The invention relates to a wireless instrument (1) includes a wristband (2) having a first (2a) and a second (2b) band portions connected to opposite edges of a casing (3), each of the first and second band portions having upper and lower surfaces. A first (4a) and a second (4b) loop antennas are embedded respectively in the first and second band portions and extend between the corresponding upper and lower surfaces, both loop antennas being connected through the opposite edges of the casing to a first (5a) and a second (5b) tuning circuits. the first and second tuning circuits are connected to an antenna receiver (6) arranged in said casing and together in a hybrid manner via an interconnection circuit (7), both tuning circuits being connected partially in parallel and partially in series.

8 Claims, 2 Drawing Sheets

U.S. PATENT DOCUMENTS

| | | | |
|---|---|---|---|
| 6,366,250 B1 * | 4/2002 | McConnell | 343/718 |
| 7,038,634 B1 * | 5/2006 | Bisig | 343/718 |
| 2005/0012671 A1 * | 1/2005 | Bisig | 343/718 |

FOREIGN PATENT DOCUMENTS

| | | |
|---|---|---|
| EP | 334 297 A2 | 3/1989 |
| EP | 443 491 | 8/1991 |
| EP | 631 341 A1 | 6/1994 |
| GB | 2 201 266 A | 8/1988 |
| JP | 58-94204 | 6/1983 |
| JP | 3-85905 | 4/1991 |
| JP | 3-181208 | 8/1991 |
| JP | 3-198532 | 8/1991 |
| JP | 3-265304 | 11/1991 |
| JP | 7-283632 | 10/1995 |
| JP | 08 330826 | 12/1996 |
| JP | 09 036630 | 2/1997 |
| JP | 09 036640 | 2/1997 |

OTHER PUBLICATIONS

Japanese Unexamined Utility Model Publication No. 56-087807, Dec. 12, 1954.

Japanese Unexamined Utility Model Publication No. 57-132283, Feb. 12, 1956.

Japanese Unexamined Utility Model Publication No. 59-64591, Apr. 19, 1984.

* cited by examiner

INTERCONNECTION CIRCUIT BETWEEN TWO LOOP ANTENNAS EMBEDDED IN A WRISTBAND OF A WRIST-CARRIED WIRELESS INSTRUMENT

FIELD OF THE INVENTION

The invention relates to a wrist-carried wireless instrument, and more particularly, to a wristwatch receiver having magnetic loop antennas embedded in the wristband. In the following specification, a loop antenna has to be understood as one single loop conductor lying substantially in the same plane, the frequency of operation of which is normally such as to give a substantially uniform current along the conductor.

BACKGROUND OF THE INVENTION

In recent years, such wireless instruments for receiving radio frequency signals with an antenna system embedded in the wristband have become common. Many prior art solutions disclose an antenna device having a circumferentially variable size, embedded in a wristband, for use with a radio that is worn on the arm of a person. By doing this, the antenna can be made long enough to receive frequency signals beyond the VHF band (30–300 MHz). As shown on FIG. 3, the loop antenna 101 can be formed in a unitary fashion inside the wristband 102, which is connected to the casing 103 of the wrist-carried wireless instrument 100 to form a continuous loop via a center fastening structure 104, for example a clasp, of the wristband when the band is fastened.

However, in such arrangements the loop connection at the center fastening structure 104 significantly influences reception. Consequently it is difficult to design a mechanism that provides favourable operation, as this part is prone to break down. In addition, the wristband 102 typically contains a wristband adjusting structure to adjust the length of the wristband to the thickness of the wearer's arm. This adjustment causes the antenna's loop length to vary from wearer to wearer, which causes variations in the receivable frequency band from one wearer to another.

A solution consisting in providing the wireless instrument 100 with an additional apparatus for compensating changes in antenna gain and resonance frequency resulting from changes in the antenna's loop length is complex and bulky, which is not desirable in such wireless instruments.

According to the U.S. Pat. No. 5,986,566, it is disclosed a solution, shown on FIG. 4, to prevent connection failure and/or breakdown due to attachment or detachment of a loop antenna, of the afore cited type, and to provide a wrist-carried wireless instrument whose receivable frequency band is not affected by the thickness of the wearer's arm.

The wrist-carried wireless instrument 110 includes a casing 113, a center fastening-type wristband 112. The wristband 112 has upper 121 and lower 122 surfaces and a fastening structure 114 at its center and consists of a pair of wristband parts 112a and 112b, each of which is attached to an end of the casing 113. A receiving antenna 111 is mounted inside in at least one part 112a of the wristband to receive signals, the antenna 111 being connected via terminals to a reception circuit inside the casing 113. According to this document, the loop antenna 111 extends between the upper 121 and lower 122 surfaces of the wristband 112 and does not go through the center fastening structure 114. It is to be noted that reception would be possible without having the wristband 112 attached and forming a loop, as it does when worn.

Nevertheless, the solution according to the U.S. Pat. No. 5,986,566 has some drawbacks. Measures done on the antenna structure described hereinbefore show non-optimum antenna efficiency as well as non-optimum noise matching. A non-negligible part of the antenna losses is due to the human wrist interfering with the antenna and also due to the dielectric material of the wristband. Antenna efficiency improvements can be achieved by reducing the ratio of the antenna losses over the antenna radiation resistance. Therefore, antenna efficiency can be improved either by reducing the antenna losses or by increasing the antenna radiation resistance.

It is then an object of the present invention to improve antenna efficiency by reducing ohmic and dielectric losses of the antenna and increasing the antenna radiation resistance.

SUMMARY OF THE INVENTION

The main object of the present invention is to realize a wrist-carried wireless instrument for receiving radio frequency signals having two loop antennas mounted inside the wristband, these antennas having improved antenna efficiency. On the one hand, reducing impact of the antenna losses can be achieved by connecting both loop antennas in parallel and, on the other hand, increasing the antenna radiation resistance can be achieved by connecting both loop antennas in series.

In order to achieve the above main object, according to a preferred embodiment of the invention, the wireless instrument comprises a wristband having a first and a second band portions connected to opposite edges of a casing, each of said first and second band portions having upper and lower surfaces. A first and a second loop antennas are embedded respectively in said first and second band portions and extend between said corresponding upper and lower surfaces. Both loop antennas are connected through said opposite edges of said casing to a first and a second tuning circuits, wherein said first and second tuning circuits are connected to an antenna receiver arranged in said casing and together in a hybrid manner via an interconnection circuit, both tuning circuits being connected partially in parallel and partially in series.

BRIEF DESCRIPTION OF THE DRAWINGS

The foregoing and additional objects, features and advantages of the present invention will be more readily apparent from the following detailed description of a preferred embodiment, as illustrated in the accompanying drawings, in which.

DETAILED DESCRIPTION OF A PREFERRED EMBODIMENT

As already mentioned herein before, the present invention concerns wrist-carried wireless instrument for receiving radio frequency signals, in the frequency band from 30 to 300 MHz and preferably in the frequency band from 88 to 108 MHz using the radio data transmission system. The invention more particularly relates to an antenna structure having optimised antenna efficiency.

Figure 1:
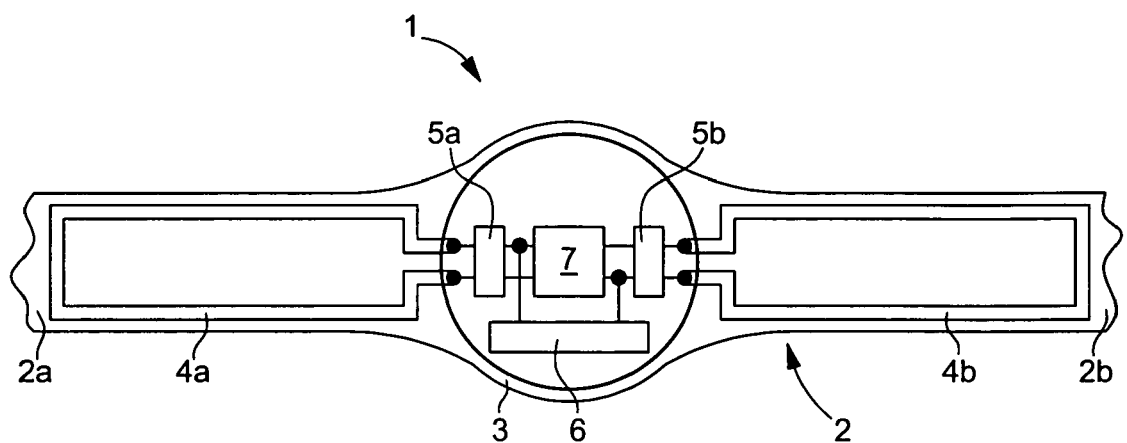
FIG. 1 is a cross-sectional view of the wrist-carried wireless instrument according to a preferred embodiment of the invention.

Referring first to FIG. 1, a cross-sectional view of a wrist-carried wireless instrument is shown. Wireless instrument 1 comprises a wristband 2 having a first 2a and a second 2b band portions connected to opposite edges of a casing 3, each band portion having upper and lower surfaces. A first 4a and a second 4b loop antennas are embedded respectively in the first and second band portions 2a and 2b and extend between the corresponding upper and lower surfaces. Both loop antennas 4a and 4b are connected through the opposite edges of casing 3 respectively to a first 5a and second 5b tuning circuits. Both tuning circuits are connected to an antenna receiver 6 arranged in said casing 3. Additionally both tuning circuits are connected together in a hybrid manner via an interconnection circuit 7 which will be more detailed with regards of FIG. 2.

Figure 2:
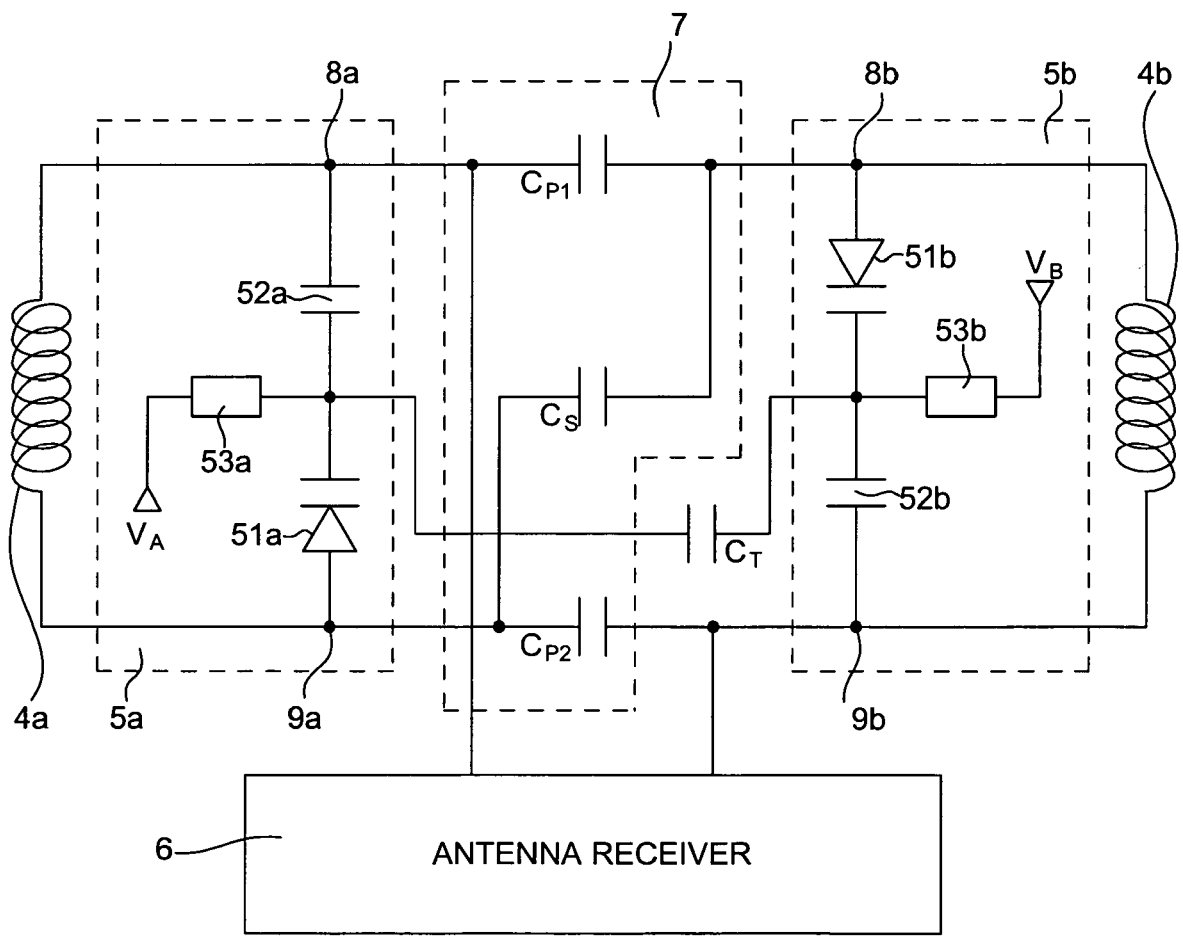
FIG. 2 is a schematic of the antenna circuits inside the casing of the wireless instrument according to a preferred embodiment of the invention.
Figure 3:
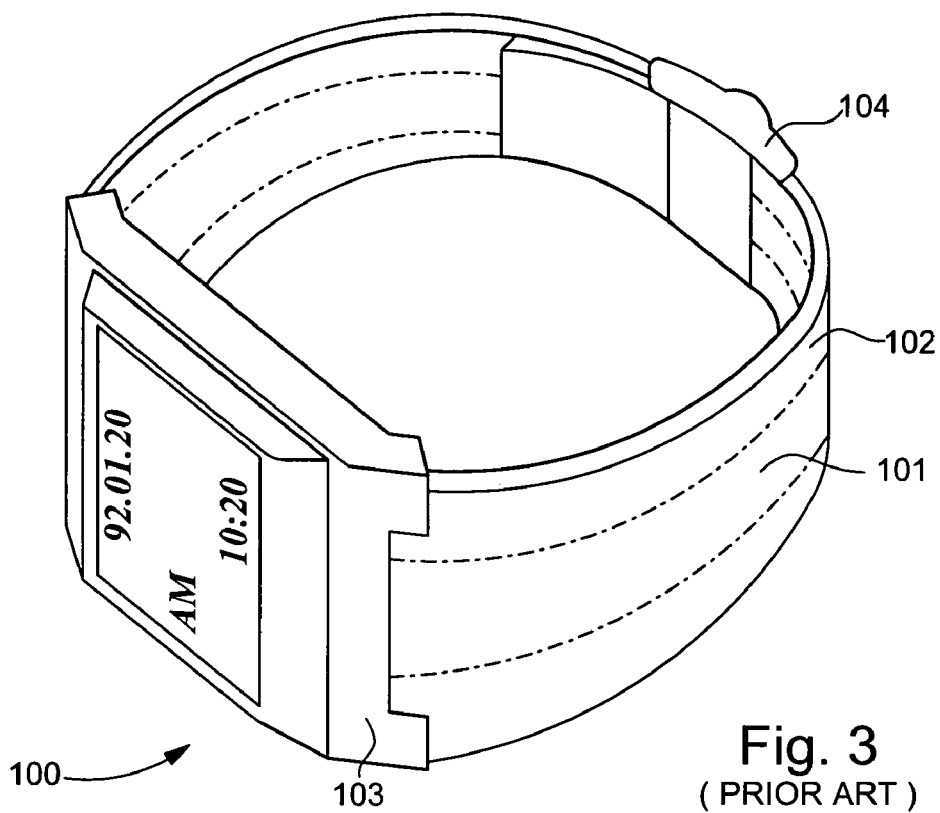
FIG. 3, already described, is a perspective view of a prior art wrist watch-style pager.
Figure 4:
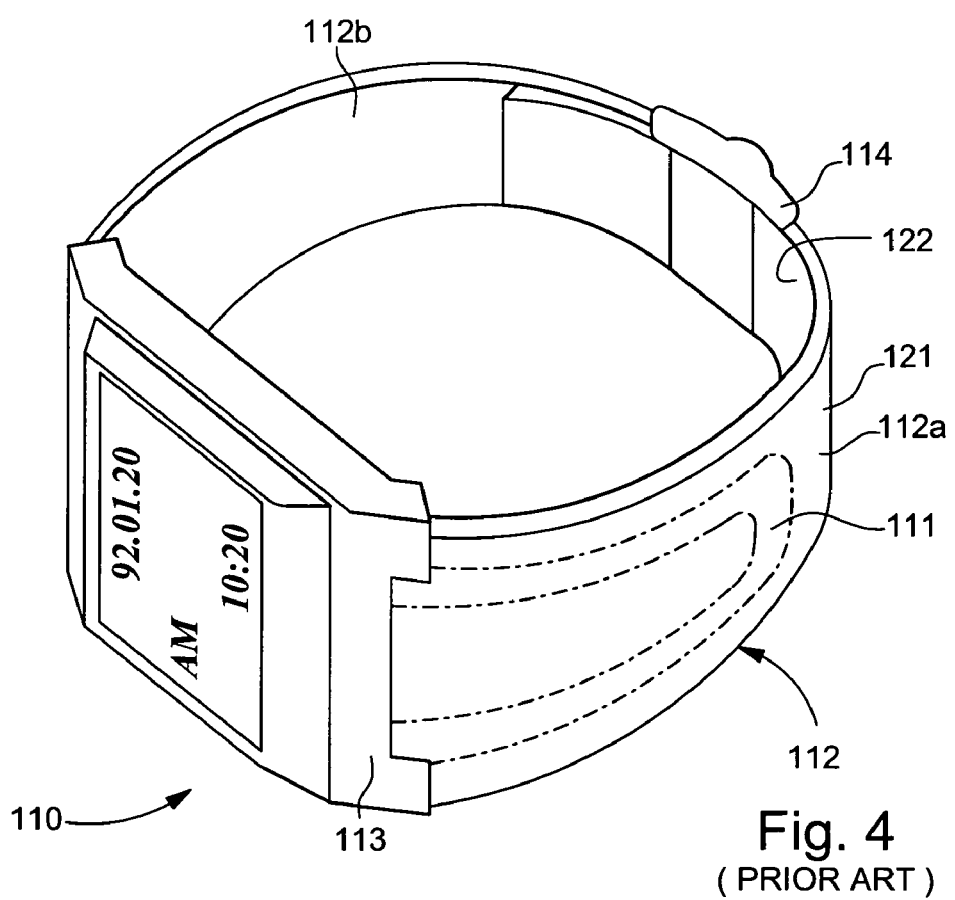
FIG. 4, already described, is a perspective view of another prior art wrist watch-style pager.

FIG. 2 shows a schematic of the antenna circuits inside the casing of the wireless instrument according to a preferred embodiment of the invention. The numerical references have been kept unchanged for the common elements with FIG. 1.

Both loop antennas 4a and 4b, schematically represented here in the form of coils, are connected to antenna receiver 6 via both tuning circuits 5a and 5b. Further, an interconnection circuit 7 is provided for interconnecting both tuning circuits 5a and 5b and then both loop antennas 4a and 4b.

As already mentioned herein before, a goal of the present invention is to optimise antenna efficiency. To achieve this goal, it is important to reduce the ratio of the antenna losses over the radiation resistance, and therefore to reduce the antenna losses and to increase the radiation resistance. It has been shown in relation with the present invention that reduction of the ohmic and dielectric losses of the antennas can be achieved by connecting both loop antennas 4a et 4b in parallel. With such a parallel connection of both loop antennas, the losses are reduced by approximately 50%, while the radiation resistance is kept on a level of a single loop antenna. It has been also shown in relation with the present invention that increase of the radiation resistance can be achieved by connecting both loop antennas 4a and 4b in series. With such a series connection of both loop antennas, the radiation resistance is increased by a factor four, while the losses are only increased by a factor of about two or a little bit more, then reducing the ratio of antenna losses over radiation resistance by a factor of about two.

For that purpose, interconnection circuit 7 is designed for interconnecting both tuning circuits 5a and 5b and then both loop antennas 4a and 4b in a hybrid manner between these two "extreme" connections, i.e. partially in parallel and partially in series. According to the preferred embodiment shown on FIG. 2, interconnection circuit 7 is a capacitor network comprising a first $C_{P1}$ and a second $C_{P2}$ capacitors connecting respectively both tuning circuits 5a and 5b partially in parallel, and a third capacitor $C_S$ connecting both tuning circuits 5a and 5b partially in series.

According to the shown example, each loop antenna, respectively 4a and 4b, is connected to the corresponding tuning circuit, respectively 5a and 5b, at two connecting points, respectively 8a, 9a and 8b, 9b. First capacitor $C_{P1}$ is connected to connecting point 8a on one side and to connecting point 8b on the other side. Second capacitor $C_{P2}$ is connected to connecting point 9a on one side and to connecting point 9b on the other side. Both tuning circuits 5a and 5b are then connected partially in parallel via both capacitors $C_{P1}$ and $C_{P2}$. Third capacitor $C_S$ is connected to connecting point 8b on one side and to connecting point 9a on the other side. Both circuits are then connected partially in series via third capacitor $C_S$. Lastly, antenna receiver 6 is connected to connecting points 8a and 9b.

It is understood, that in an alternative way the same result can be obtained with third capacitor $C_S$ being connected to connecting points 8a and 9b, and with antenna receiver 6 being connected to connecting points 8b and 9a.

With this hybrid connection, both loop antennas are then connected partially in parallel and partially in series, which allow the ratio of antenna losses over radiation resistance to be greatly reduced and antenna efficiency greatly increased.

In order to further increase antenna efficiency, it is important to take care about the tuning circuit components. As a matter of fact, tuning of loop antennas is necessary because of the small bandwidth of this type of antenna. This tuning can be achieved by using varactors.

According to the preferred embodiment shown on FIG. 2, each antenna tuning circuit, respectively 5a and 5b, is designed for introducing minimum conductive losses by connecting varactors in parallel.

Therefore first tuning circuit 5a includes a capacitor 52a and a varactor 51a connected in series and a resistor 53a connected between capacitor 52a and varactor 51a on one side and to a determined potential $V_A$ on the other side. Resistor 53a supplies varactor 51a with a constant tuning voltage during radio reception, the varactor capacitance being changed with this tuning voltage. Therefore, any particular reception frequency of the antenna requires a different varactor capacitance that is tuned by this tuning voltage. Voltage $V_A$ is determined by way of conventional means, for example with a binary search algorithm.

Second tuning circuit 5b is of the same type as tuning circuit 5a. It includes a capacitor 52b and a varactor 51b connected in series and a resistor 53b connected between capacitor 52b and varactor 51b on one side and to a determined potential $V_B$ on the other side. Resistor 53b supplies varactor 51b with a constant tuning voltage during radio reception, the varactor capacitance being changed with this tuning voltage. Therefore, any particular reception frequency of the antenna requires a different varactor capacitance that is tuned by this tuning voltage. Voltage $V_B$ is also determined by way of conventional means, for example with a binary search algorithm.

As an alternative, each tuning circuit can include two varactors, instead of one varactor and one capacitor, connected in series but in opposite polarisation in order to optimise the behaviour of these tuning circuits.

To improve large signal response of tuning circuits 5a and 5b, both varactors 51a and 51b are connected in an-"anti" parallel way, being then in opposite polarisation. Even with asymmetry of both tuning circuits, it is nevertheless a preferred solution because it introduces fewer losses and requires fewer components than symmetrical tuning circuits that comprise each two varactors in series and in opposite polarisation.

Additionally, tuning circuits 5a and 5b are preferably provided with a capacitor $C_T$ for adjusting their tuning range, which is connected between capacitor 52a and varactor 51a of first tuning circuit 5a on the one side, and between varactor 51b and capacitor 52b of second tuning circuit 5b on the other side.

It is to be noted that the loop antennas are preferably rectangular or so-called opened O-shaped. Advantageously, both loop antennas have the same shape in order to preserve symmetry. However, it is understood that any other loop antenna shape can be used as long as it fits into wristband portions. Both antennas operate preferably in the frequency band from 88 to 108 MHz using the radio data transmission system.

It is also to be noted that the wireless instrument is preferably a wristwatch.

Finally, it is understood that the above-described embodiments are merely illustrative of the many possible specific embodiments, which can represent principles of the present invention. Numerous and varied other arrangements, in particular of the tuning circuits and of the interconnection circuit, can readily be devised in accordance with these principles by those skilled in the art without departing from the scope and spirit of the invention.

What is claimed is:

1. A wireless instrument comprising
   a wristband having a first and a second band portions connected to opposite edges of a casing, each of said first and second band portions having upper and lower surfaces,
   a first and a second single loop antennas being embedded respectively in said first and second band portions and extending between said corresponding upper and lower surfaces, both single loop antennas being connected through said opposite edges of said casing to a first and a second tuning circuits, wherein
   said first and second tuning circuits are connected to an antenna receiver arranged in said casing and together in a hybrid manner via an interconnection circuit, both tuning circuits being connected partially in parallel and partially in series.

2. The wireless instrument according to claim 1, wherein said interconnection circuit is a capacitor network comprising a first and a second capacitors connecting said first and second tuning circuits partially in parallel, and a third capacitor connecting said first and second tuning circuits partially in series.

3. The wireless instrument according to claim 2, wherein each of said first and second tuning circuits has a first and a second connecting points, wherein said first and second capacitors are respectively connected to said first connecting points and to said second connecting points of both tuning circuits, and said third capacitor is connected to said second connecting point of said first tuning circuit and to said first connecting point of said second tuning circuit, and wherein said antenna receiver is connected between said first connecting point of said first tuning circuit and said second connecting point of said second tuning circuit.

4. The wireless instrument according to claim 1, wherein each of said first and second tuning circuits is formed by a capacitor and a varactor in series and by a resistor connected between said capacitor and said varactor on one side and to a determined potential on the other side.

5. The wireless instrument according to claim 4, wherein a capacitor for adjusting tuning range of said first and second tuning circuits is connected between said capacitor and said varactor of said first tuning circuit on the one side and between said varactor and said capacitor of said second tuning circuit on the other side.

6. The wireless instrument according to claim 1, wherein both single loop antennas are substantially rectangular or opened O shaped.

7. The wireless instrument according to claim 1, wherein both single loop antennas operate in the frequency band from 88 to 108 MHz.

8. The wireless instrument according to claim 1, wherein said wireless instrument is a wristwatch.

* * * * *